(12) United States Patent
Garg et al.

(10) Patent No.: US 12,400,199 B2
(45) Date of Patent: Aug. 26, 2025

(54) DYNAMIC CUSTOM AUTOMATED TELLER MACHINE (ATM) PAYLOAD

(71) Applicant: Bank of America Corporation, Charlotte, NC (US)

(72) Inventors: Saurabh Garg, Faridabad (IN); Maneesh Kumar Sethia, Hyderabad (IN); Shailendra Singh, Thane West (IN); Ajay Kumar Gowni, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 107 days.

(21) Appl. No.: 18/418,414

(22) Filed: Jan. 22, 2024

(65) Prior Publication Data

US 2025/0238776 A1   Jul. 24, 2025

(51) Int. Cl.
*G06Q 20/10* (2012.01)
*G06Q 20/02* (2012.01)
*G06Q 20/32* (2012.01)
*G06Q 20/38* (2012.01)

(52) U.S. Cl.
CPC ....... *G06Q 20/1085* (2013.01); *G06Q 20/027* (2013.01); *G06Q 20/3829* (2013.01); *G06Q 20/389* (2013.01); *G06Q 20/3224* (2013.01); *G06Q 20/326* (2020.05)

(58) Field of Classification Search
CPC ............. G06Q 20/1085; G06Q 20/027; G06Q 20/3829; G06Q 20/389; G06Q 20/326; G06Q 20/3224

USPC .......................................................... 705/71
See application file for complete search history.

(56) References Cited

U.S. PATENT DOCUMENTS

| | | | | |
|---|---|---|---|---|
| 2021/0174347 | A1* | 6/2021 | Rose | H04L 63/0428 |
| 2022/0414260 | A1* | 12/2022 | Latka | G06F 21/6245 |
| 2023/0376919 | A1* | 11/2023 | Hill | H04W 4/02 |
| 2024/0348650 | A1* | 10/2024 | Dyer | G06Q 40/08 |
| 2025/0022066 | A1* | 1/2025 | Dyer | H04L 63/20 |
| 2025/0037107 | A1* | 1/2025 | Abdelrahman | G10L 15/183 |
| 2025/0209893 | A1* | 6/2025 | Selvaraj | G07F 19/211 |

* cited by examiner

*Primary Examiner* — Courtney P Jones
(74) *Attorney, Agent, or Firm* — Weiss & Arons LLP (57) ABSTRACT

Systems, methods, and apparatus are provided for implementing a dynamically customized ATM payload. An ATM may extract a user identifier and home region during a session. The ATM may be a node on a distributed network and securely publish data to a distributed hash table. Extracted data may trigger smart contract logic including a transaction rule associated with the user and a transmission rule restricting network switches for payload delivery outside the home region. AI algorithms may generate a custom payload including the transaction rule and an interface adapted for the user home region. The payload may be pushed to the ATM via a set of spine-leaf switches based on the transmission rule. The payload may be deployed at the ATM during the session to modify a default ATM interface and a default ATM transaction rule. The ATM may purge the payload from memory when the session is terminated.

22 Claims, 5 Drawing Sheets

DYNAMIC CUSTOM AUTOMATED TELLER MACHINE (ATM) PAYLOAD

FIELD OF TECHNOLOGY

Aspects of the disclosure relate to deploying a dynamically generated automated teller machine (ATM) payload on a global distributed network.

BACKGROUND OF THE DISCLOSURE

A user may need to access an ATM located outside their home region. The ATM may be located outside their home country. The ATM interface may be in an unfamiliar language and may include unfamiliar transaction options.

It would be desirable to dynamically generate a software payload to adapt the ATM for the user. It would be desirable to use smart contract logic to encode transaction rules and deployment rules for the custom payload. It would be desirable to use artificial intelligence (AI) to generate the payload based on the smart contract logic and based on data and metadata associated with the user. It would be desirable to deploy the payload within an existing ATM framework and to purge the payload at the termination of the ATM session.

It would be desirable to deploy the payload via a secure global channel in compliance with international regulations. Specifically, it would be desirable to generate a global channel for deploying the payload by using a spine and leaf network to route the payload through a set of switches that conform to regulatory requirements.

SUMMARY OF THE DISCLOSURE

Systems, methods, and apparatus are provided for implementing a dynamically customized ATM payload via a secure global channel.

When a user initiates an ATM session, the ATM may extract a user identifier and a user home region. The ATM may function as a node on a distributed network. The ATM may maintain extracted data in a cryptographically secured hash chain signed with a private key. The distributed network may include a distributed hash table configured to validate the hash chain.

At the distributed network, the extracted user identifier may trigger smart contract logic. The smart contract logic may include a transaction rule associated with the user and a transmission rule restricting network switches for payload delivery to a geographic location outside the home region.

The distributed network may use artificial intelligence to generate a custom payload including the transaction rule and an interface configured for the user home region. The artificial intelligence may access data published to the distributed hash table. The network may push the custom payload to the ATM via a set of spine-leaf switches. The location and/or distribution of the set of switches may be determined based at least in part on the transmission rule.

The custom payload may be deployed at the ATM during the user session. The custom payload may adapt a default ATM interface and a default ATM transaction rule. The ATM may purge the custom payload from ATM memory in response to termination of the ATM session.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Systems, methods, and apparatus are provided for implementing a dynamically customized ATM payload via a secure global channel.

For the sake of illustration, the invention will be described as being performed by a "system." The system may include one or more features of apparatus and methods that are described herein and/or any other suitable device or approach.

The system may adapt an ATM for a user outside their home region by dynamically generating and deploying a payload during an ATM session. The system may adapt a default ATM interface to include a language of the home region. The system may adapt a default ATM interface to include advertising of the home region. The system may adapt the ATM interface to include transaction options of the home region.

In some embodiments, the system may adapt the default ATM interface based on preferences associated with the user. In some embodiments, the system may adapt ATM protocols based on transaction rules associated with the user.

The payload may be part of a protocol data unit transmission. A network packet may include the payload along with a header.

The system may include one or more automated teller machines (ATMs). Each ATM may function as a node in a distributed network. Each node may store data and transactions in a local chain that is cryptographically signed and indexed.

The system may use distributed network protocols to extract and validate data from the nodes and populate a distributed hash table (DHT). The system may extract data from an ATM access card to identify a customer. The system may extract metadata from an ATM access card to identify a customer, identify a home region, and/or identify customer preferences.

The distributed network may use a Holochain® framework. Holochain® is trademark of Holo Ltd. The Holochain framework may validate cryptographically stored data from a network node based on shared network rules.

Holochain is an open source framework for developing fully distributed peer to peer applications. Holochain differs from data-centric systems such as blockchain which enforce data consensus across the entire network. Holochain is an agent-centric network in which each agent or node maintains its own cryptographically secured hash chain. Each new hash chain entry is signed with a private key.

Content from each ATM may be shared to a DHT. The DHT may validate the node using Holochain validation rules and may then publish the data. Every authentic application on the Holochain network will comply with the network validation rules.

Because each Holochain node maintains its own separate ledger and does not require consensus for each transaction, the computational speed is significantly faster than other decentralized network models. Holochain networks may function without proof of work or proof of stake. The framework typically does not require advanced computing capacity and can run without a graphical processing unit or a physics processing unit. The scalability of a Holochain framework may enable the system to easily incorporate new ATM locations.

The Holochain framework may validate the authenticity of content from the network nodes using a variety of shared network rules. Illustrative rules include validating the content authenticity by using the cryptographic address of content to determine when the content originated or when the content was modified, the duration between document creation and modification, and whether the originator and modifier are from the same internet IP address. Holochain rules may validate metadata including a memory check of documents, financial amounts, and format.

A user may interact with an ATM outside their home region. The ATM may extract user data. The ATM may extract data from a user access card, a QR code generated by a mobile device application, or any suitable authentication presented at the ATM.

The extracted data may include a user identifier. The user identifier may be an access card number. The user identifier may be a portion of an access card number, such as the fifth through eighth digits. The user identifier may be an account number or any suitable identifier.

The extracted data may include a user home region. The home region may be associated with issuance of the access card. The home region may be associated with a user address.

The ATM may store the extracted data in a cryptographically secured hash chain signed with a private key. The ATM may extract metadata associated with the user access card. The metadata may include customer preferences. The extracted data may be published to a DHT.

The system may include an ATM network. The ATM network or a portion of the ATM network may be a distributed network. The ATM network may use a Holochain framework. The ATM network may detect an event at the ATM. The event may be authentication of a user access card. The event may be activation of a user access card. The event may be initiation of a transaction by a user.

The event may include extraction of user data and/or metadata. The event may include validation of a cryptographically secured hash chain including extracted user information. The event may include publication of the extracted user information to a DHT.

The ATM network may detect an event that involves a user outside their home region. The event may trigger smart contract logic. The smart contract may include rules for a dynamically customized software payload to adapt the ATM for the user.

The smart contract rules may include transaction rules. The transaction rules may include a set of transactions associated with the user home region. The transaction rules may include limits on the transactions available to the user. The transaction rules may include limits on the amount of a transaction. The transaction rules may include taxes or fees applicable to the set of transactions. The transaction rules may include regulatory requirements associated with the user home region.

The smart contract rules may include transmission rules. The transmission rules may identify geographic network switch locations that do not comply with regulations for transmission of the payload. Regulatory requirements may restrict international transmission of financial data.

In some embodiments, the smart contract rules may include rules for the content of the payload.

The ATM network may include generative artificial intelligence (AI) algorithms. The algorithms may include a generative adversarial network (GAN) or any suitable algorithms. The AI algorithms may be associated with the distributed network. The AI algorithms may be maintained at a central enterprise server or at any suitable location.

The generative AI may extract information from the DHT. The extracted information may include user data and/or metadata from the ATM. The extracted information may include smart contract rules. In some embodiments, the generative AI may access user information stored in enterprise databases. The generative AI may generate a software payload.

In some embodiments the generative AI may extract information from multiple DHTs, each associated with a different distributed network. Each DHT may be associated with a different entity or a different geographic region. For example, smart contract rules may be stored in a different DHT from extracted user data.

The payload may be a limited payload. The payload may be designed to adapt an existing ATM package rather than replacing it. As such, the payload may not include the entire suite of ATM components. Limiting the payload may enable faster generation, faster transmission, and faster deployment at the ATM. Limiting the payload may enable deployment within the ATM session.

The payload may be maintained in the DHT. The payload may be pushed to an ATM.

The system may use spine-leaf infrastructure for routing the payload to the ATM. Spine-leaf architecture is a network topology with two switching layers. The leaf layer may consist of access switches that deliver network connection points for servers. Leaf switches may connect directly into the spine, or network core. Spine switches may interconnect all leaf switches in a full-mesh topology. Alternatively, the system may use a three-layer core-aggregation-access topology, a hybrid multi-tier spine-leaf topology, or any suitable topology or combination of topologies.

Spine-leaf architecture helps data networks lower the hop count which reduces latency and improves efficiency. Spine-leaf architecture may also enable the system to control routing in compliance with home region regulations for international transmission of user financial data.

The smart contract logic may include routing rules. The routing rules may include requirements for the spine-leaf infrastructure. The routing rules may include restrictions on the geographic locations of network switches.

In some embodiments, the software payload may include information from multiple entities, each with partial information for the software package. For example, customer information may be stored at a first entity while transaction rule data may be stored at a second entity. As such, multiple entities may be involved in package delivery. The system may coordinate network switches for the pieces of the package in addition to the switch to the final ATM location when the package is complete.

In some embodiments, ATMs in the distributed network may all be associated with a single financial institution. The distributed network may be associated with the same financial institution.

In some embodiments, ATMs in the distributed network may be associated with different financial institutions. The financial institutions may be part of a consortium of financial institutions. The consortium of financial institutions may maintain the distributed network. In some embodiments, each financial institution in the consortium of financial institutions may be responsible for maintaining a different regional network.

In some embodiments, an ATM in the distributed network may be a generic ATM that is not associated with any financial institution. An ATM user may be associated with a specific financial institution. The software payload may include a proprietary interface associated with the user financial institution.

The dynamic payload may be implemented in an illustrative scenario where the user is traveling outside their home region. An ATM may be dynamically adapted for language and transaction options that are familiar to the user from their home region. The ATM may be dynamically adapted for user interests and preferences.

The dynamic payload may be implemented in an illustrative decentralized financing scenario. In this scenario, an ATM may be a generic ATM that is not owned by a single financial entity. The ATM may be contracted to a consortium of financial institutions. When a user initiates a session, the system may generate a dynamic payload that is customized for one of the institutions in the consortium. The payload may adapt the ATM to function as an ATM owned by the financial institution.

The system may integrate ATM-based components with network-based components. A network module may use the Holochain framework. The network module may include an event tracing module. The event tracing module may detect actions at the ATM. The event tracing module may detect an event involving an ATM access card. The event tracing module may detect a customer interaction with an ATM interface.

The network module may include a smart contract module. Information extracted from a user ATM card may trigger smart contract logic. The smart contract logic may include limits on a user ATM experience. For example, the smart contract logic may include authentication requirements. The smart contract logic may include limits on the types of transactions available. The smart contract logic may include limits on amounts for each type of transaction.

The network module may include an AI module. The AI module may use extracted user data, metadata, and smart contract parameters to generate a custom software payload for the ATM in real time.

When deployed at the ATM, the software payload may adapt a default ATM interface. The default ATM interface may be specific to the geographic region of the ATM. The adapted interface may include any suitable customization. For example, the adapted interface may include a language customized to the customer. The adapted interface may include product advertising customized to the customer. The adapted interface may include a layout or presentation that is customized to user preferences. The adapted interface may include accommodations for user access such as larger text or increased contrast. The customization may be based on metadata extracted from an ATM card. The customization may be based on user activity during the ATM session. The customization may be based on a history of user activity during previous ATM sessions.

The network module may include a payload acquisition module. The payload acquisition module may acquire the payload from the generative AI module. The payload acquisition module may extract the payload from a DHT. The payload acquisition module may interface with an ATM. The network may use a spine-leaf architecture to ensure that switches comply with regulations for cross-border transmission of financial data. The payload acquisition module may push the payload to the ATM using the spine-leaf network.

The system may include a payload release module. The payload release module may deploy the update on the ATM. The payload release module may communicate with an ATM monitoring module. The monitoring module may receive continuous real time feedback regarding the deployment of the payload. The ATM may be configured to delete the custom payload from memory after a predetermined amount of time. The ATM may be configured to delete the custom payload from memory at the termination of the ATM session. The ATM monitoring module may monitor the removal of the payload. The payload release module and the ATM monitoring module may be installed on the ATM. In some embodiments, the payload release module and the ATM monitoring module may be network-based modules.

The system may interact with a mobile device application. The mobile device application may be installed on a user device. The mobile device application may be associated with a user financial institution.

The mobile device application may identify the geographic location of the mobile device. The system may verify that the mobile device is within a predetermined distance from the ATM before deploying the payload.

In some embodiments, the mobile device application may transmit a communication to the user. The communication may include a link or a button to confirm the location of the user. The mobile device application may include a chat feature. In some embodiments, the chat feature may be automated. The mobile device application may communicate with the user via the chat feature. The system may require a confirmation from the user before deploying the payload.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
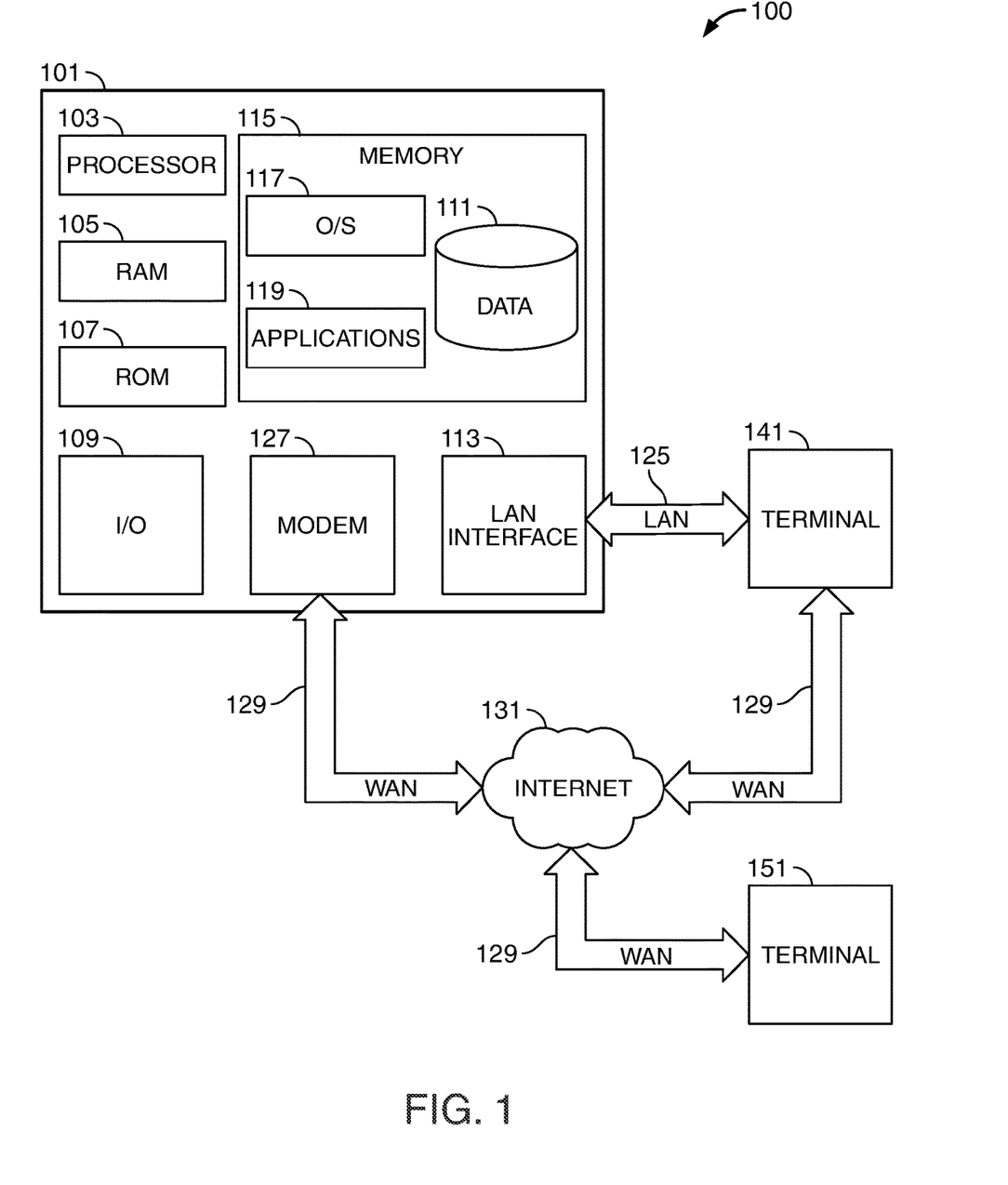
FIG. 1 shows illustrative apparatus in accordance with principles of the disclosure.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may include processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or flash memory or any other suitable components, may also be part of computer 101.

Memory 115 may include any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 may connect to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
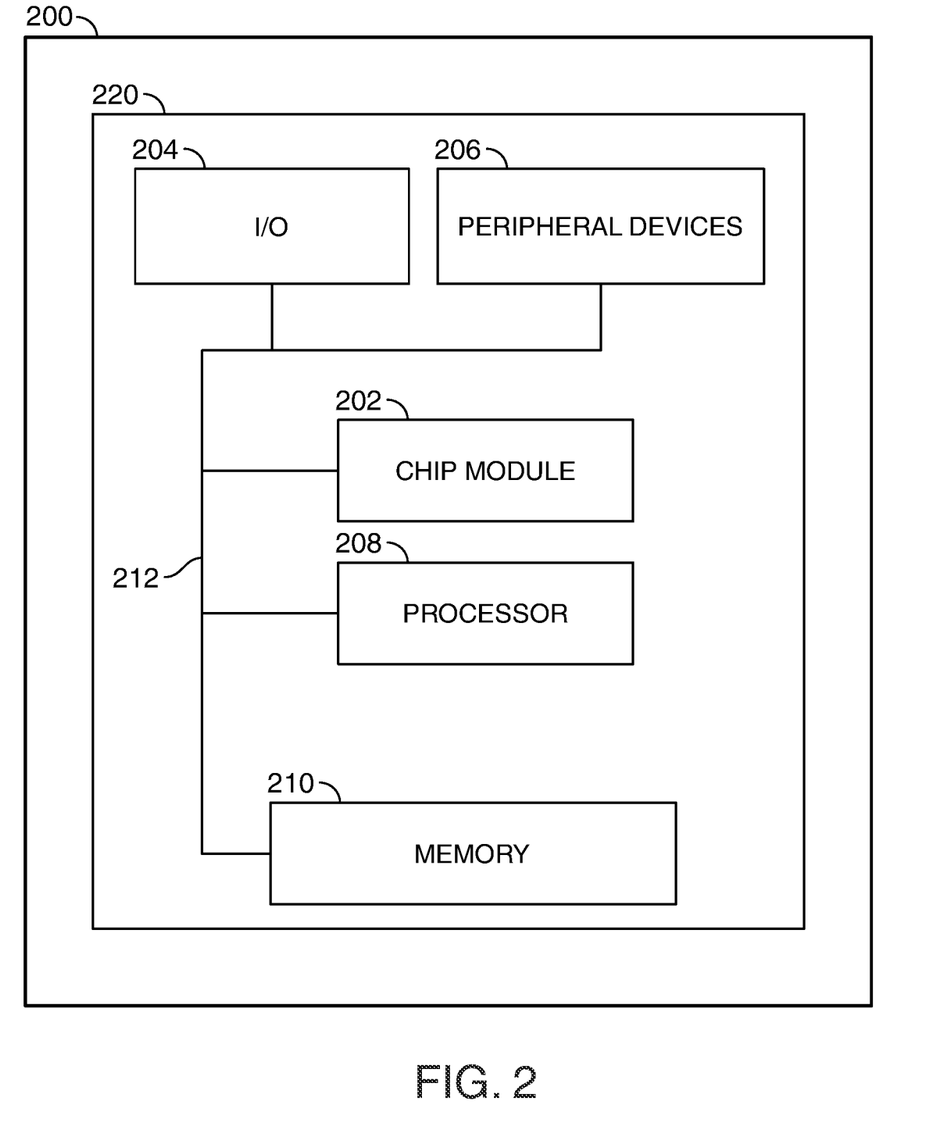
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
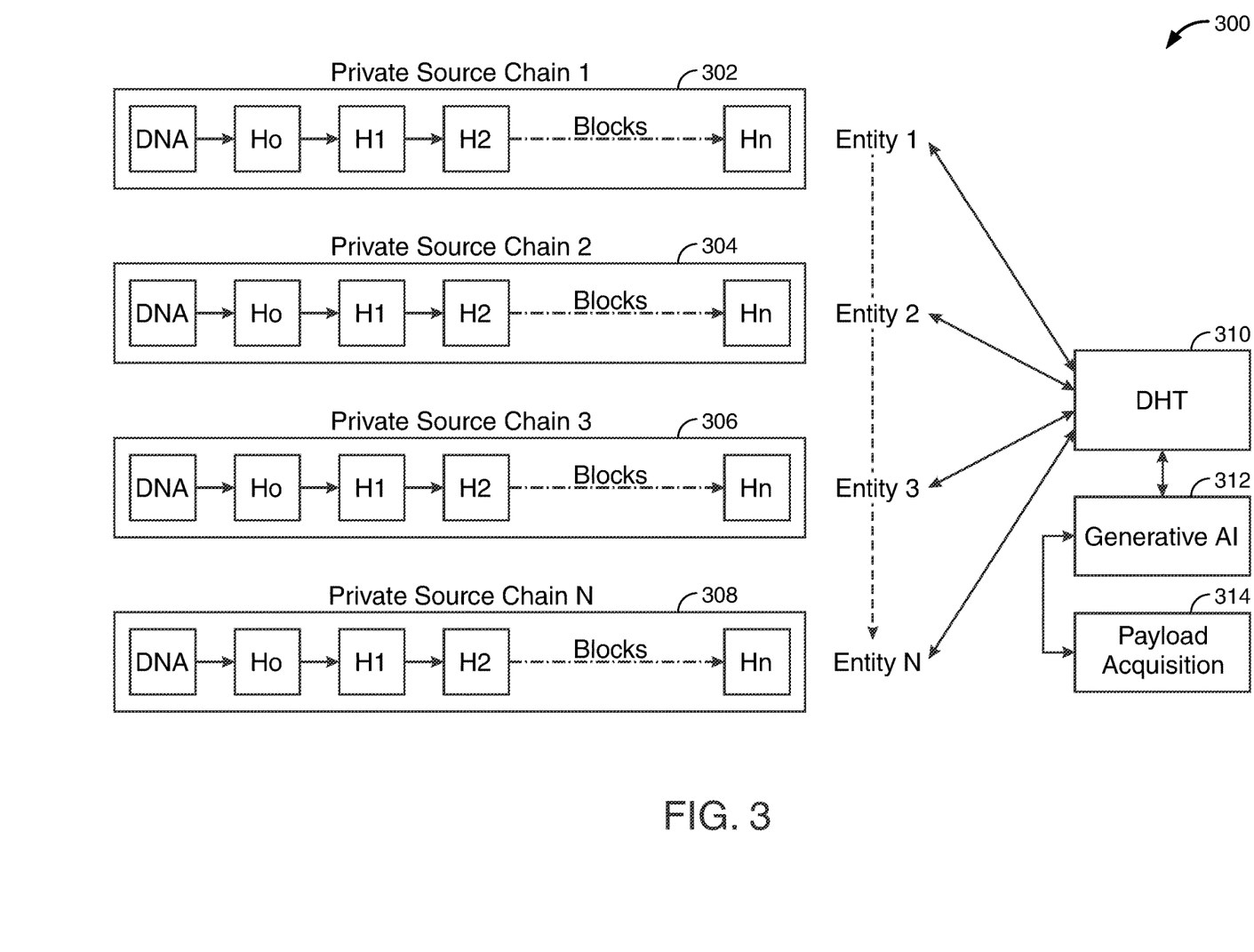
FIG. 3 shows an illustrative process flow in accordance with principles of the disclosure.

FIG. 3 shows illustrative process flow 300 for generating the custom payload. Entities 1 through N may be nodes on a distributed network. The entities may include ATMs. The entities may include financial institution servers or other repositories of financial data.

The distributed network may use a Holochain framework. Each entity may maintain cryptographically secured private source chains 302-308. Source chains 302-308 may include a DNA core which contains functions for writing and accessing data, connecting with peers, and validating data. The DNA may create a hash chain with each entry signed by a private key. The fingerprint of the DNA marks the beginning of the source chain.

Data from the private source chains 302-308 may be published to DHT 310 via a peer-to-peer network. The data may include user data and metadata extracted during an ATM session. The data may include smart contract transaction or transmission rules associated with a user ATM session.

Generative AI algorithms 312 may extract data from DHT 310 to create the custom payload for a user ATM session. Payload acquisition module 314 may obtain the custom payload to push to the ATM.

Figure 4:
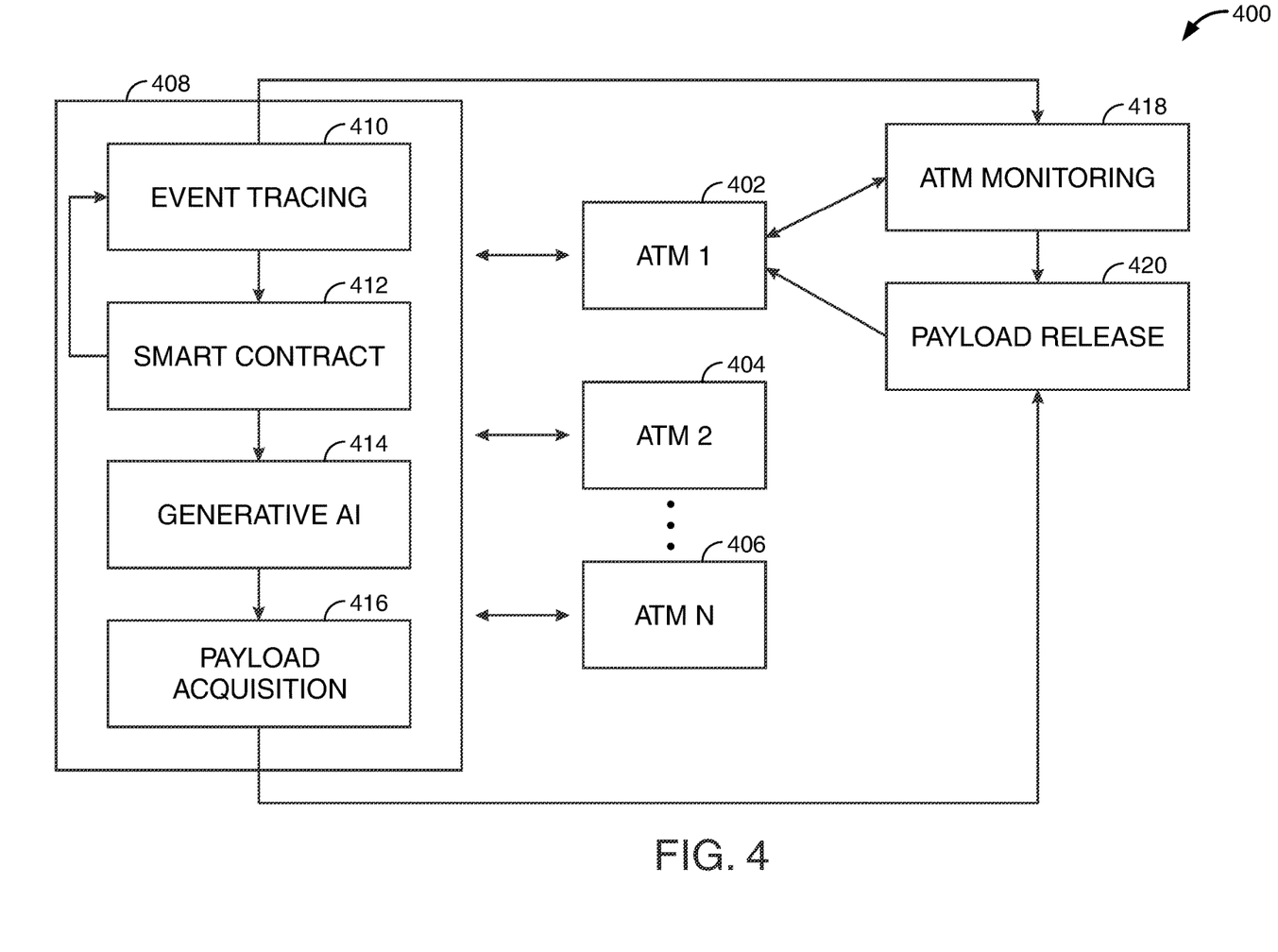
FIG. 4 shows an illustrative process flow in accordance with principles of the disclosure.

FIG. 4 shows illustrative process flow 400 for generating and deploying the custom payload. ATMs 402-406 may be nodes on a distributed network. ATMS 402-406 may be in communication with network module 408.

At 410, the network may identify an event at an ATM. The event may be initiation of an ATM session or any suitable event. At 412, the smart contact logic may be triggered. The smart contact may include rules associated with the event. The smart contract may include rules for a custom payload associated with the event.

At 414, generative AI algorithms may assemble a custom payload based on the smart contract rules. The algorithms may include a GAN or any suitable algorithm. The custom payload may include any suitable computer program code. At 416, the custom payload may be received for transmission to the ATM. The custom payload may be transmitted through a set of switches determined based on the smart contract rules.

The custom payload may be transmitted to payload release module 420. In illustrative process 400, the custom payload may be deployed during a session at ATM 402. Payload release module 420 may reside on ATM 402. In some embodiments, payload release module 420 may reside on the ATM network. Payload release module 420 may deploy the custom payload on the ATM.

ATM monitoring module 418 may monitor the deployment. ATM monitoring module 418 may ensure that the custom payload integrates with the existing ATM software. ATM monitoring module 418 may ensure that the custom payload is purged at the end of the ATM session.

Figure 5:
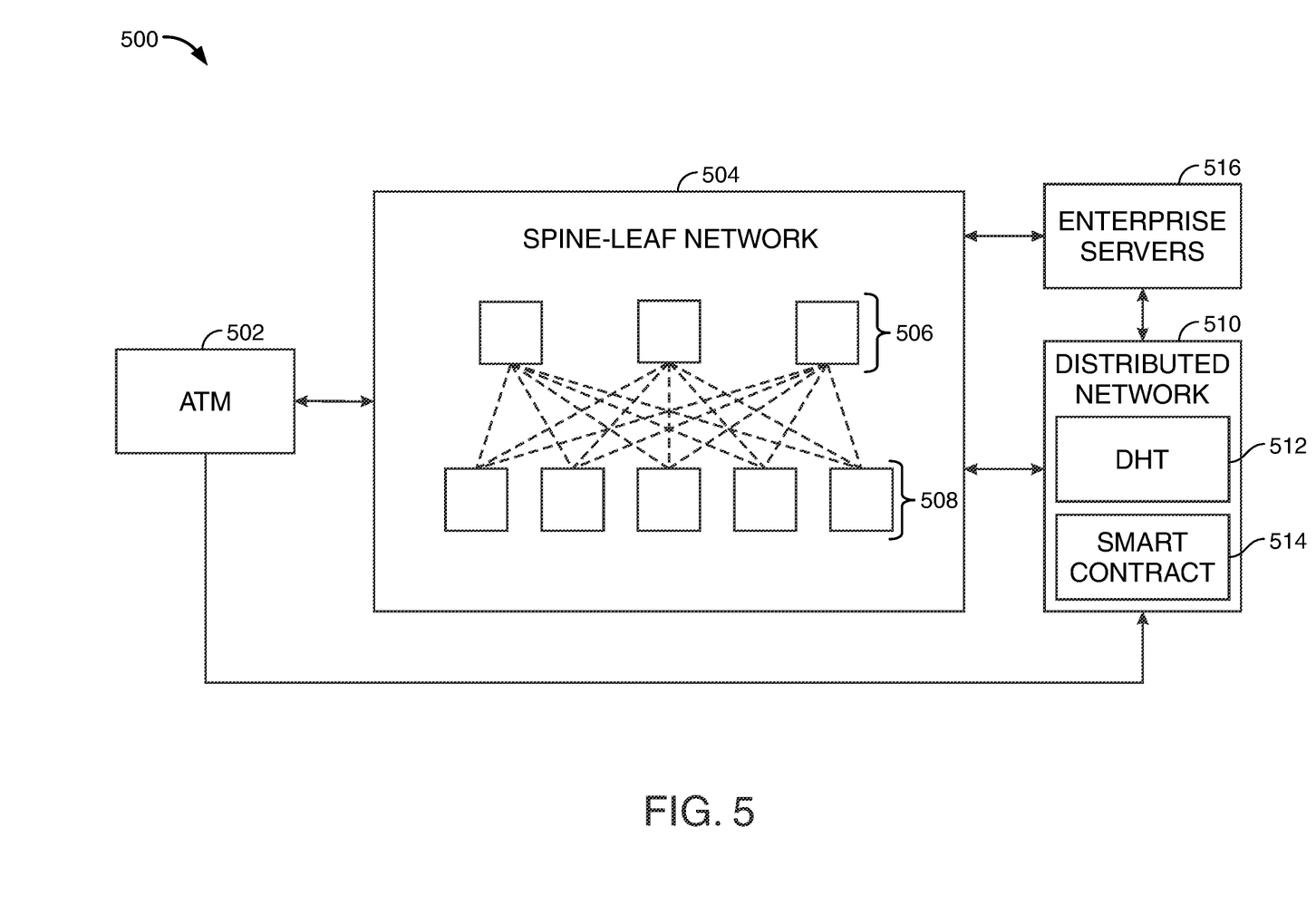
FIG. 5 shows an illustrative architecture in accordance with principles of the disclosure.

FIG. 5 shows illustrative architecture 500 for generating and deploying the custom payload. Information extracted from ATM 502 may be validated by distributed network 510. Distributed network 510 may use a Holochain framework. Distributed network 510 may store extracted data in DHT 512. Distributed network 510 may store a custom payload generated by the system in DHT 512.

Distributed network 510 may include smart contract 514. In some embodiments, smart contract 514 may be stored on a different accessed by distributed network 510. Extracted data from ATM 502 may trigger smart contract 514.

Smart contract 514 may include rules for transmission of the custom payload. The rules may specify transmission via spine-leaf network 504. Spine-leaf network 504 may include spine switches 506 and leaf switches 508. Leaf switches 508 may communicate with enterprise servers 516, elements of distributed network 510, and/or ATM 502. Smart contract 514 may include rules for the location and/or distribution of network switches 506 and 508. The custom payload may be pushed from DHT 512 to ATM 502 via spine-leaf network 504.

Thus, methods and apparatus for a DYNAMIC CUSTOM ATM PAYLOAD are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for adapting an ATM by generating a custom payload during an ATM session, the ATM comprising a node on a distributed network, the method comprising:
   at an ATM session, extracting a user identifier and a user home region, the ATM configured to maintain extracted data in a cryptographically secured hash chain signed with a private key, the distributed network comprising a distributed hash table configured to validate the hash chain;
   based on an extracted user identifier, triggering smart contract logic comprising a transaction rule associated with the user;
   using generative artificial intelligence, assembling a custom payload comprising the transaction rule and an interface configured for the user home region;
   delivering the custom payload to the ATM via a set of spine-leaf switches, the set of switches determined based at least in part on the smart contract logic;
   deploying the custom payload at the ATM, the deploying comprising adapting a default ATM interface and default ATM transaction rule; and
   purging the custom payload from ATM memory in response to termination of the ATM session.

2. The method of claim 1, the generative AI configured to assemble the custom payload based on data extracted from the distributed hash table.

3. The method of claim 1, the generative AI configured to assemble the custom payload based on data extracted from multiple distributed hash tables, each associated with a different entity.

4. The method of claim 1, further comprising extracting a user preference, the custom payload interface configured based on the user preference.

5. The method of claim 1, wherein the distributed network uses a Holochain® framework.

6. The method of claim 1, further comprising determining, using a mobile device application, whether a geographic location of the user is within a predetermined distance from a geographic location of the ATM before deploying the custom payload on the ATM.

7. The method of claim 1, further comprising verifying a user location via an automated chat in a mobile device application before deploying the custom payload on the ATM.

8. The method of claim 1, the interface configured for the home region comprising a language different from a language of the default ATM interface.

9. The method of claim 1, the interface configured for the home region comprising a set of transaction options different from a set of transaction options at the default ATM interface.

10. One or more non-transitory computer-readable media storing computer-executable instructions which, when executed by a processor on a computer system, perform a method for generating a custom payload during an ATM session, the ATM comprising a node on a distributed network, the method comprising:
   at the ATM:
      extracting a user identifier and a user home region, the ATM configured to maintain extracted data in a cryptographically secured hash chain signed with a private key, the distributed network comprising a distributed hash table configured to validate the hash chain;
      deploying a custom payload modifying a default ATM interface and a default ATM transaction rule; and
      purging the custom payload from ATM memory in response to termination of the ATM session;
   at the distributed network:
      based on an extracted user identifier, triggering smart contract logic comprising:
         a transaction rule associated with the user; and
         a transmission rule restricting network switches for payload delivery outside the user home region;
      using artificial intelligence (AI), generating a custom payload comprising the transaction rule and an interface configured for the user home region; and
      delivering the custom payload via a set of spine-leaf switches, the set of switches determined based at least in part on the transmission rule.

11. The media of claim 10, the AI configured to generate the custom payload based on data extracted from the distributed hash table.

12. The media of claim 10, further comprising extracting a user preference, the custom payload comprising an interface configured based on the user preference.

13. The media of claim 10, wherein the distributed network uses a Holochain® framework.

14. The media of claim 10, the interface configured for the home region comprising a language different from a language of the default ATM interface.

15. The media of claim 10, the interface configured for the home region comprising a set of transaction options different from a set of transaction options at the default ATM interface.

16. A system for generating and deploying a custom payload during an ATM session, the ATM comprising a node on a distributed network, the system comprising:
   an ATM configured to:
      extract a user identifier and a user home region, the ATM maintaining extracted data in a cryptographically secured hash chain signed with a private key, the distributed network comprising a distributed hash table configured to validate the hash chain;
      deploy a custom payload modifying a default ATM interface and a default ATM transaction rule; and
      purge the custom payload from ATM memory in response to termination of the ATM session;
   an ATM network configured to:
      based on an extracted user identifier, trigger smart contract logic comprising:
         a transaction rule associated with the user; and
         a transmission rule restricting network switches for payload delivery outside the home region;
      using one or more artificial intelligence (AI) algorithms, generate a custom payload comprising the transaction rule and an interface configured for the user home region; and
      deliver the custom payload via a set of spine-leaf switches, the set of switches determined based at least in part on the transmission rule.

17. The system of claim 16, the AI algorithms configured to generate the custom payload based on data extracted from the distributed hash table.

18. The system of claim 16, the AI algorithms configured to assemble the custom payload based on data extracted from multiple distributed hash tables, each associated with a different entity.

19. The system of claim 16, the ATM configured to extract metadata comprising a user preference, the custom payload interface configured based on the user preference.

20. The system of claim 16, wherein the distributed network uses a Holochain® framework.

21. The system of claim 16, further comprising a mobile device application, the mobile device application configured to determine whether a geographic location of the user is within a predetermined distance from a geographic location of the ATM before deploying the custom payload on the ATM.

22. The system of claim 16, further comprising a mobile device application, the mobile device application configured to verify a user location via an automated chat in the mobile device application before deploying the custom payload on the ATM.

* * * * *